(12) United States Patent
Kumar et al.

(10) Patent No.: US 7,836,079 B2
(45) Date of Patent: Nov. 16, 2010

(54) VIRTUAL UNIVERSAL NAMING CONVENTION NAME SPACE OVER LOCAL FILE SYSTEM

(75) Inventors: Rohan Kumar, Redmond, WA (US); Neal R. Christiansen, Bellevue, WA (US); Eileen Brown, Seattle, WA (US); Garret J. Buban, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 11/279,022

(22) Filed: Apr. 7, 2006

(65) Prior Publication Data

US 2007/0239720 A1 Oct. 11, 2007

(51) Int. Cl.
*G06F 17/30* (2006.01)

(52) U.S. Cl. .......................... 707/783; 726/27
(58) Field of Classification Search .............. 707/9, 707/1, 3
See application file for complete search history.

(56) References Cited

U.S. PATENT DOCUMENTS

| | | | |
|---|---|---|---|
| 5,341,499 A | 8/1994 | Doragh | |
| 5,689,701 A | 11/1997 | Ault et al. | |
| 5,893,118 A * | 4/1999 | Sonderegger | 707/203 |
| 6,026,402 A * | 2/2000 | Vossen et al. | 707/9 |
| 6,061,692 A * | 5/2000 | Thomas et al. | 707/200 |
| 6,256,031 B1 | 7/2001 | Meijer et al. | |
| 6,408,298 B1 | 6/2002 | Van et al. | |
| 6,513,048 B1 * | 1/2003 | Engle et al. | 707/200 |
| 6,654,794 B1 * | 11/2003 | French | 709/217 |
| 6,789,094 B2 | 9/2004 | Rudoff et al. | |
| 6,850,959 B1 | 2/2005 | Golds | |
| 7,356,711 B1 * | 4/2008 | Calinov et al. | 713/180 |
| 2002/0124072 A1 | 9/2002 | Tormasov et al. | |
| 2004/0181576 A1 * | 9/2004 | Lin et al. | 709/203 |
| 2004/0204949 A1 * | 10/2004 | Shaji et al. | 705/1 |
| 2005/0091214 A1 | 4/2005 | Probert et al. | |
| 2005/0234866 A1 * | 10/2005 | Kyler | 707/1 |
| 2006/0242142 A1 * | 10/2006 | Coen et al. | 707/6 |

OTHER PUBLICATIONS

Awan, et al., "Stackably Extensible Template Layer for File System Development Under Windows NT", IEEE, Aug. 2004, pp. 74-82.
O.T. Anderson, et al., "Global Namespace for Files", IBM Systems Journal, 2004, pp. 702-722, vol. 43, No. 4.

* cited by examiner

*Primary Examiner*—Charles Kim
*Assistant Examiner*—Anteneh Girma
(74) *Attorney, Agent, or Firm*—Workman Nydegger (57) ABSTRACT

Systems and methods that create a virtual name space of Universal Naming Convention (UNC) over a local file system (e.g., drive letter based names), via employing a UNC provider and filter arrangement that changes a name in the file object to reparse it to a volume where the local file exists. A name in the file object is changed to a local name (e.g., morphed name); subsequently reparsed and forwarded to a Name Space Owner component (NSO). As such, a request can originate from a UNC stack and reparsed on the local stack. The name space is presented to an application in UNC format, while the underlying file write occur in the file system.

17 Claims, 9 Drawing Sheets

VIRTUAL UNIVERSAL NAMING CONVENTION NAME SPACE OVER LOCAL FILE SYSTEM

BACKGROUND

Increasing advances in computer technology (e.g., microprocessor speed, memory capacity, data transfer bandwidth, software functionality, and the like) have generally contributed to increased computer applications in various industries. Moreover, operating system platforms have enabled the rapid growth of various technologies that are developed on such systems. Many of such platforms run various applications, wherein addition of extra components such as new hardware devices and associated drivers may become necessary. For instance, these systems allow installation of hardware or software components on respective platforms, whereby such components can be plugged into the system with assurance that they will also cooperate with the system, to interact with other devices/components that have already been installed.

Moreover, operating systems employ storage mediums and databases that further utilize a directory, wherein typically the file system can expose two types of names, namely: the drive letter based names, and the Universal Naming Convention (UNC) file systems that are typically handled by remote file systems.

The drive letter based names can include a path, such as a string path containing directory references (e.g., names), folder names, files, and the like. The path string can be composed by concatenating such references, folder names, files, and the like, wherein the path string can relate to a particular file within the database and/or file storage system.

For example, a traditional file storage system can have a directory containing a folder "Documents," a sub-folder "Processing," and a file "application.ext," wherein ".ext" can be a file extension specified for the particular database and/or file storage system. Thus, the path string can be "C:/" or "D:/" for example. Utilizing such path string can present several problems. The paths and/or path strings can eventually become large such that storing a path for every item and/or file in the system consumes a large amount of storage space and/or is slow to access. Additionally, typical path strings can be limited with the characters associated therewith. Moreover, renaming files and/or items can affect every item in such database and/or file storage system.

Similarly, the UNC name space implements a system of naming files among computers on a network, so that a file on a given computer will have the same pathname when accessed from any of the other computers on the network. For example, if the directory c:\path1\path2\ . . . pathn on computer servern is shared under the name pathdirs, a user on another computer would open \\servern\pathdirs\filename.ext to access the file c:\path1\path2\ . . . pathn\filename.ext on servern. However, interaction with UNC path names can create complexities, when multiple name spaces are to be associated with a single data store, for example.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods that create a virtual name space of Universal Naming Convention (UNC) over a local file system (e.g., drive letter based names), via employing a UNC provider and a file system filter arrangement that change a name in a file object, to reparse it to a volume where the local file exists. Such reparse occurs on a local file system stack, with the request originating from a remote UNC stack. Accordingly, the name space can be exposed in UNC format, yet the underlying file write can occur in a local file system.

In a related aspect, to initiate an activity/function by a user on the file system, a "create file" request can be called and a handle on the file created, to issue read/write commands, for example. Subsequently, the create file request can be transferred to an Input/Output (I/O) manager that handles the request. In general, the I/O manager determines that the UNC name format should be directed to a Multiple UNC Provider (MUP) component. Moreover, such MUP component determines which file system can handle the incoming file. Next, the file can be forwarded to a UNC provider (such as a Rich Storage File UNC provider.) The I/O manager can subsequently be notified of the MUP component's decision. Moreover, a UNC filter stack can be positioned between the I/O manager and the Rich Storage File UNC provider, for example. The files are physically stored on the file system (e.g., New Technology File System—NTFS), and such files are typically not exposed, as they typically form an internal implementation of the file system.

Accordingly, items/objects that flow down from the user mode to kernel mode, (e.g., as part of the create file request) can form a data structure for the file object. Such data structure can include an associated name file, wherein a name in the file object can be changed to a local name (e.g., morphed name), and reparsed to a volume where the local file resides. Moreover, by identifying the volume (e.g., storage location) of the file that the user is opening, the status reparse can then be forwarded to such volume. The status reparse can designate to the I/O manager whether the name in the file has been changed, and that a re-processing is required—even though a failure has not occurred.

For example, a request for the UNC name can originate as \\machinename\sharename\dir1\dir2 . . . dirn\foo.doc, and if the volume that hosts the store is C:, the changed or morphed name can be in form of: C:\$RsFxNameStart$\machinename\sharename\dir1\dir2 . . . dirn\\foo.doc. Subsequently, such name can be forwarded to a local stack, wherein a filter driver that is located on the File System (e.g., NTFS) can look for and identify a prefix that is associated with such name. As such, the filter can trap the request forwarded to the local stack. The UNC name space (as opposed to the drive letter based name space) is portable across machines, and can be exposed to applications/users. At the same time, the underlying file write can occur in the file system. Similarly, an "open file" request can be initiated by the application/user, which can be handled by the UNC provider and an associated filter arrangement.

The subject innovation enables both a UNC namespace provider and a local namespace provider to employ the same data store. For example, such can occur by allowing the UNC name provider to change create requests into their local equivalent. Moreover, all "opens" can then act as local opens, and utilize the same data store. Files that are opened in such manner can be marked, so that they are differentiated from files that were opened via the local name directly. This further allows a filter on the local side to recognize such files and treat namespace requests differently. For example, such can enable an application and/or filter to observe two different namespaces that access the same data.

According to a further aspect of the subject innovation, a user mode process (as opposed to a file system) can own and manage name spaces. For example, in one aspect of the subject innovation, user mode processes are enabled to register with a file system—such as a Rich Storage File System—and manage name spaces. Moreover, a name space owner component (NSO) can contain a list of the file names saved on the file system, and include a mapping component that enables mapping between UNC file names and file locations. Typically, due to a filter block, only the NSO can look into the local name, and such access is denied to other parties.

To the accomplishment of the foregoing and related ends, certain illustrative aspects of the claimed subject matter are described herein in connection with the following description and the annexed drawings. These aspects are indicative of various ways in which the subject matter can be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component can be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Figure 1:
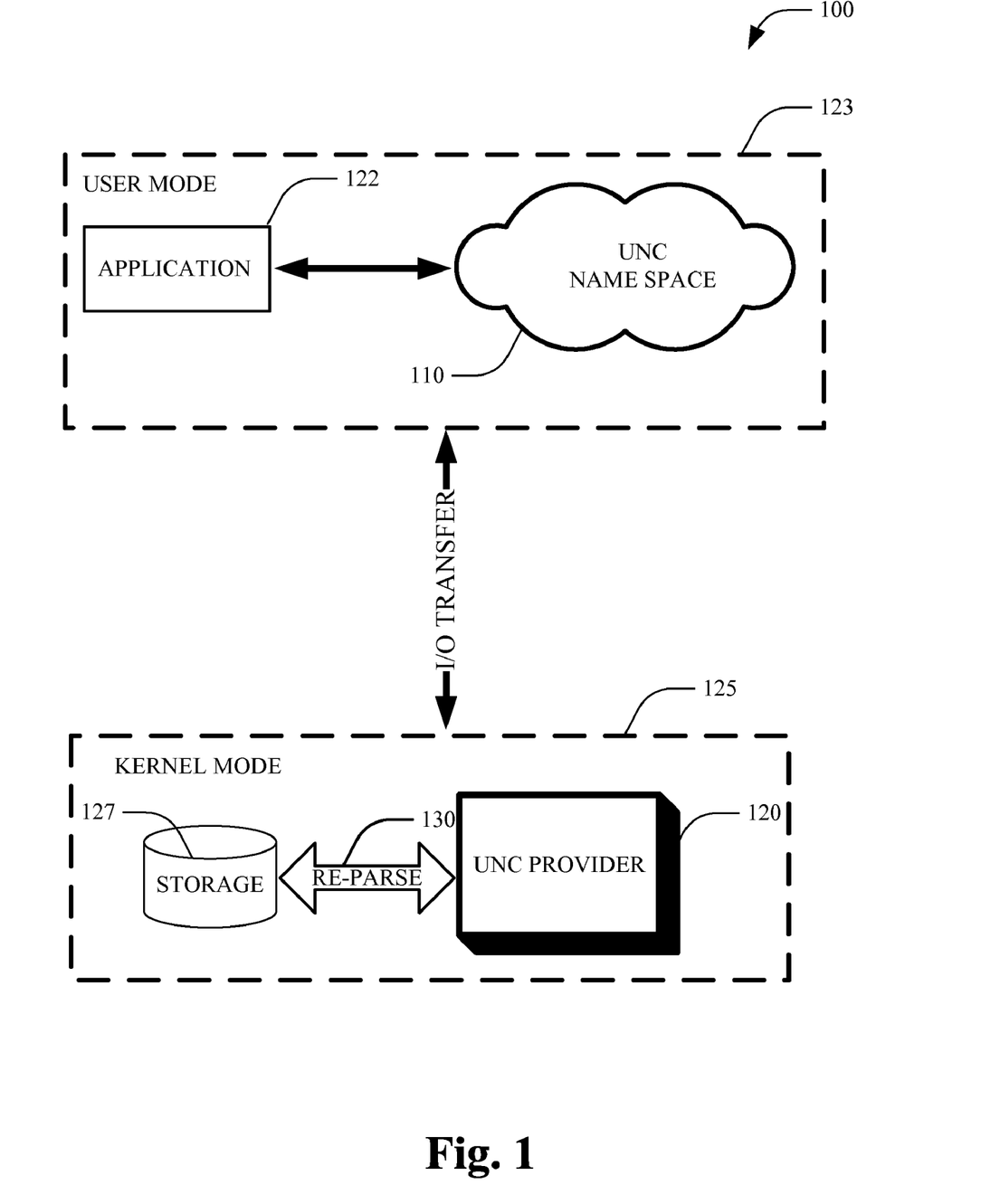
FIG. 1 illustrates a block diagram of a system that exposes a Universal Naming Convention (UNC) to an application/user in accordance with an aspect of the subject innovation.

Turning initially to FIG. 1, a system 100 is illustrated that creates a virtual name space of Universal Naming Convention (UNC) 110 over a local file system 125 (e.g., drive letter based names), via employing a UNC provider 120 and filter arrangement (not shown). The system 100 can change a name in the file object, and reparse 130 such name on a volume that the local file exists.

For example, a request for the UNC name can originate as \machinename\sharename\dir1\dir2 . . . dirn\foo.doc, and if the volume that hosts the store is C:, the morphed name can be in form of C:\$RsFxNameStart$\machinename\sharename\dir1\dir2 . . . dirn\foo.doc. Such name can be forwarded to a local stack, where a filter driver (not shown) that is located on the File System (e.g., NTFS—not shown) examines such name for an identification prefix (e.g., prefix located in a file name of the file object.) As such, the filter can trap the request forwarded to the local stack. Such reparse 130 occurs on a local stack, while the associated request actually originates from a UNC stack. Accordingly, the name space can be exposed in UNC format 110, while the underlying file write can occur in the file system. The UNC namespace 110 (as opposed to the drive letter based name space) is portable across machines, and can be exposed to applications and users—while at the same time, the underlying file write can occur in the file system.

The system 100 provides for opening a file in a manner similar to opening a file on the file system (e.g., New Technology File System—NTFS), yet the application/user 122 is inter-acting with a UNC name space 110. For example, upon a "create file" call initiated by the application 122, such call can flow down to the UNC stack, wherein a handle and file object relation is established. Moreover, flow of activities and files associated with the call occurs as though the call is a local create request, and not a request associated with a UNC space 110 that exists on a UNC stack. Items that flow down from the user mode 123 to the Kernel mode 125, as part of the create file request, can include a data structure for the file object. Such data structure can further consist of a name in the file object, which can then be changed to a local name (e.g., morphed name), and reparsed 130 on a volume that the local file exists. Moreover, by identifying the volume (e.g., storage location) of the file that the user is opening, the reparse (e.g., in form of a status notification) can then be forwarded to the volume. The reparse 130 can designate to the I/O manager that the name in the file has been changed, and as such re-processing is required even though a failure has not occurred. Accordingly, the name space can be exposed in UNC format, yet the underlying file write can occur in the file system.

Moreover, the file system can incorporate a data model, such as a file storage data model that enables storing, finding, and relating information. For example, an information type can include, a document, an image, a video, a contact, a message, an email, an audio clip, and the like. The informational types can include units of information, which can be represented as instances of complex types that are part of a type system that supports inheritance.

A type storage system 127 associated with a local filter stack of system 100 can store the type instance and query to efficiently and effectively find at least one of items, documents, and/or contacts. The type storage system can receive data, wherein the data can include a type, a criteria, a schema, a query criteria, and the like. Specifically, storing the type instance that relates to an informational type (e.g., a document, an image, a video, a contact, a message, an email, an audio clip) can provide advantages such as; finding an item in the file storage data model that satisfy a certain criteria; finding a document in the file storage data model that satisfy a particular criteria; and finding a contact (e.g., including an individual, organization, and group) that satisfy a certain criteria.

The type storage system 127 associated with the system 100 can utilize a relational database technique associated to a relational storage and a relational query. It is to be appreciated that such capabilities can be provided by a database engine (not shown). The relational database techniques can be associated with relational databases, wherein a relational database is a collection of data items organized as a set of formally described tables. The data within the tables can be accessed and/or reassembled in various ways without the requirement of reorganizing the database tables. Furthermore, the relational database can be easily extended, such as adding new categories without modifications to existing applications and/ or data. It is to be appreciated that the subject innovation is not limited to relational databases and/or associated techniques and that any suitable technique can be utilized.

Figure 2:
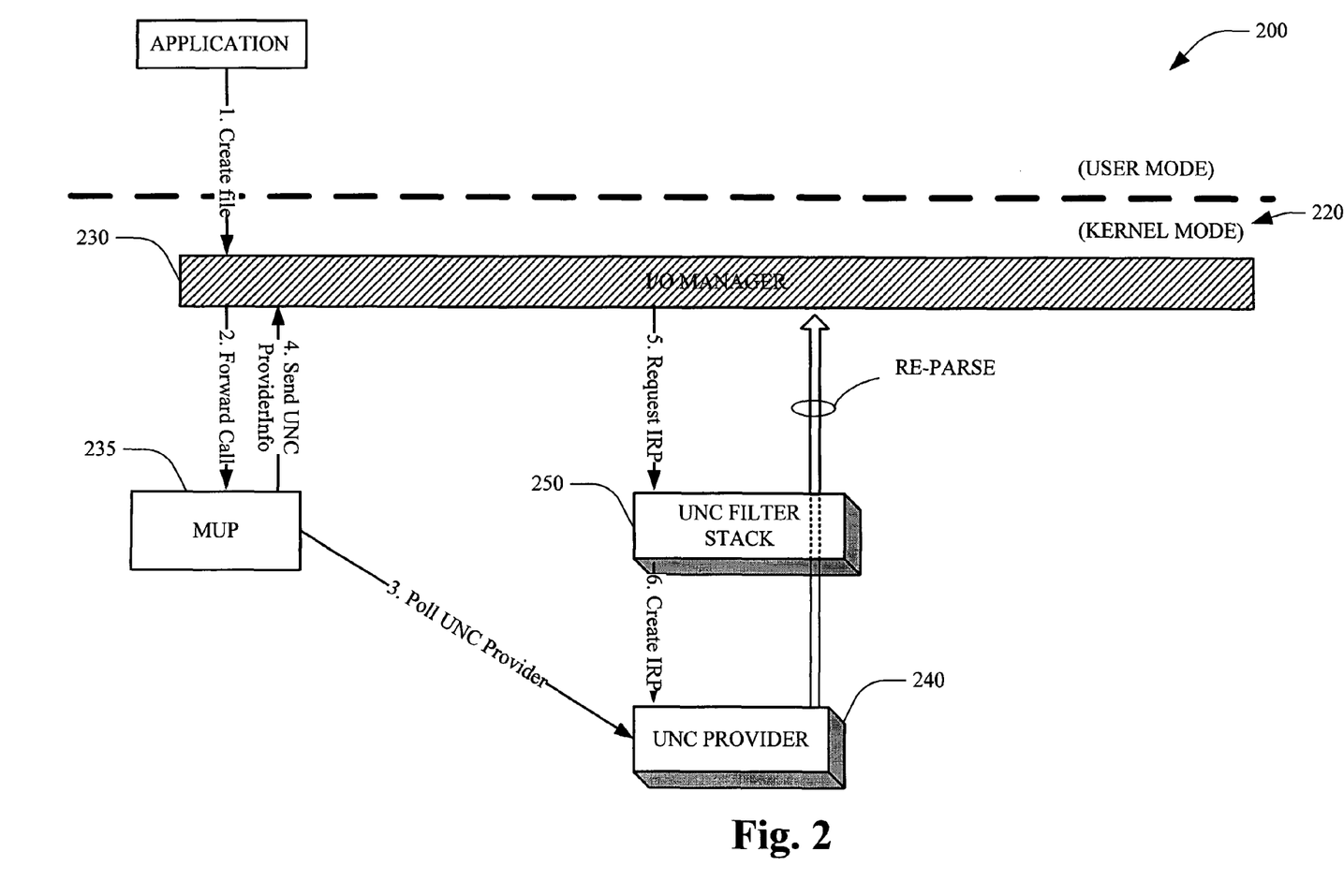
FIG. 2 illustrates an exemplary block diagram of a system that creates a virtual name space of Universal Naming Convention over a local file system.

FIG. 2 illustrates an exemplary block diagram of a system 200 that creates a virtual name space of Universal Naming Convention (UNC) over a local file system. Typically, the kernel 220 forms the nucleus or core of a computer operating system. An operating system is generally responsible for processing data and managing input and output. Kernel 220, as part of the operating system, is loaded first and remains in main memory. In addition to being responsible for process management, file management, and memory management, inter alia, the kernel 220 provides the essential services or procedures required by applications and drivers. Procedures can correspond to but are not limited to I/O scheduling, buffering, spooling, and error handling. Furthermore, it should be noted that the term kernel-mode service or kernel-mode procedure as used herein is intended to cover any service, procedure, driver, application or other component located in the kernel address space As illustrated in FIG. 2, to initiate an activity/function by a user on the file system, the "create file" request can be called and a handle on the file created, to issue read/writes and the like. Such create file request is transferred to an Input/Output (I/O) manager 230, which handles the request. The I/O manager 230 determines whether the UNC name format in general should be directed to the Multiple UNC Provider (MUP) component 235. Such MUP component 235 can determine which file system should handle the incoming file. Subsequently, the file can be forwarded to a UNC provider—such as a Rich Storage File UNC provider 240. The I/O manager 230 is subsequently notified of the MUP component's decision. In between the I/O manager 230 and the Rich Storage File UNC provider 240, a UNC filter stack 250 can be positioned, to verify that data passed is proper, for example. In addition, the files can be physically stored on the file system (e.g., New Technology File System), and such typically is not exposed, as it is an internal implementation of the file system.

The I/O manager 230 can then send a request to create I/O Request Packet (IRP), which are structures employed by a Driver Model and operating system to communicate with each other, and are typically created by the I/O Manager 230 on the behalf of a driver. Such driver can be a software component that resides in between the operating system and the hardware and allows the operating system to communicate with the hardware. In the system 200, the driver(s) can be inserted into the kernel 220, allowing for support of specific hardware or for extension of the operating system or both.

The create IRP request can reach the Rich Storage UNC provider 240 after passing through the attached filter(s) 250. The Rich Storage UNC provider can change the FileName of the FileObject to a morphed local name (with the volume which hosts the filestream files for this store and original UNC name encoded), and can return a reparse message that ultimately goes back to I/O manager 230. Subsequently, the I/O Manager 230 can reparse to the local stack, to reach the UNC filter stack 250. Moreover, the volume to be reparsed can be identified based on a sharename. For example, items that flow down as part of the create file request, can include a data structure for the file object. Such data structure includes a file therein, and hence the name in the file object can be changed to a local name (e.g., morphed name) and/or reparsed on a volume that the local file exists. Moreover, by identifying the volume (e.g., storage location) of the file that the user is opening, the status reparse can then be forwarded to such volume. The status reparse can designate to the I/O manager 230 that the name in the file has been changed, and as such re-processing is required—even though a failure has not occurred. It is to be appreciated that FIG. 2 illustrates a particular arrangement, and other possible layouts are well within the realm of the subject innovation. For example, the MUP component 235 can be positioned between the UNC Filter stack 250 and the UNC provider 240. As another example, the UNC filter stack 250 can be removed, and the MUP component 235 placed between the UNC provider 240 and the I/O manager 230.

Figure 3:
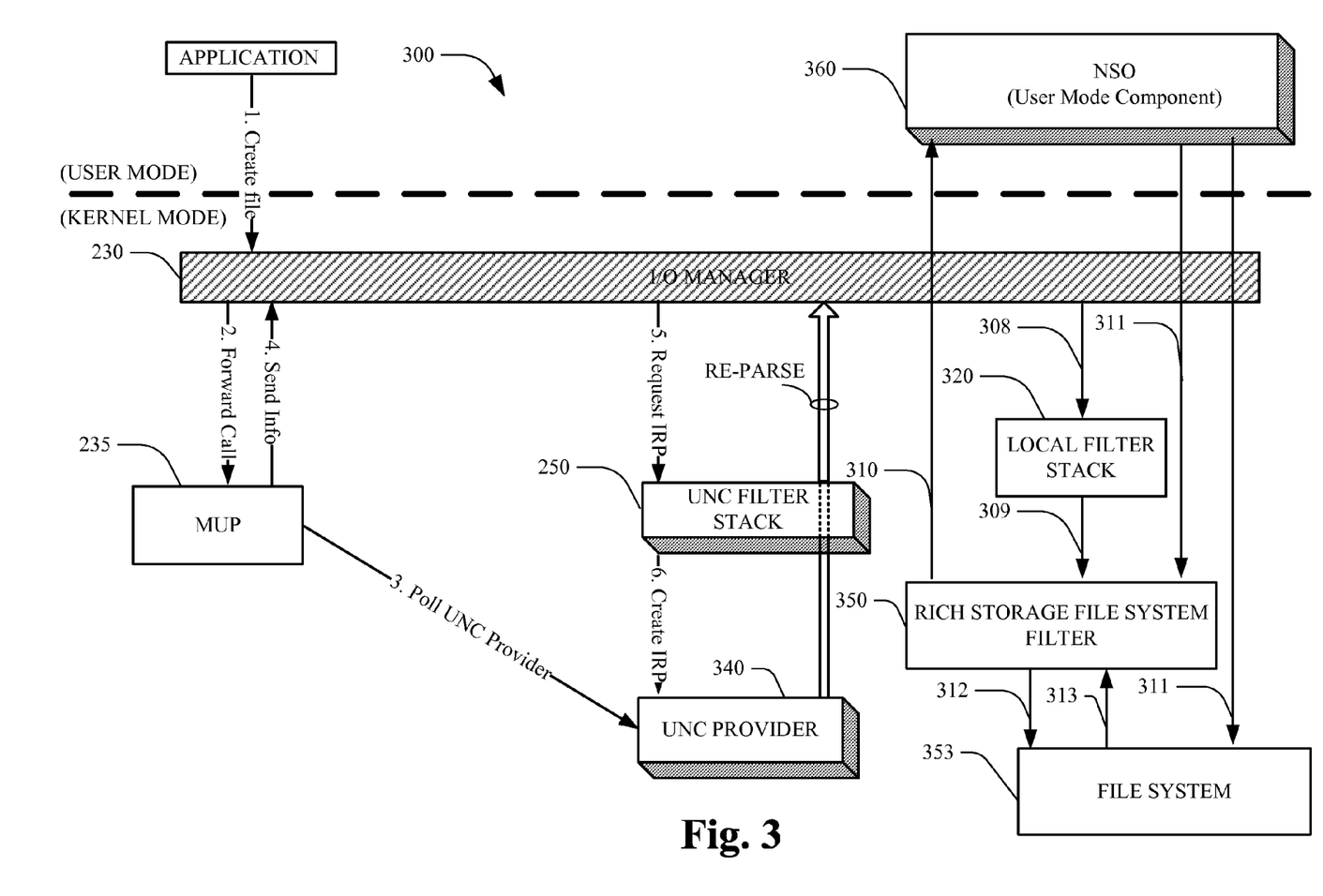
FIG. 3 illustrates a particular block diagram for a system that reparses a user request on local stack, wherein the request originates from a UNC stack in accordance with an aspect of the subject innovation.

FIG. 3 illustrates a particular block diagram for a system 300 that reparses a user request on a local stack, wherein the request originates from a UNC stack. The system 300 includes a Name Space Owner (NSO) component 360 that maintains a mapping between a UNC space (exposed to the user/application) and the local names (files on the file system). As explained earlier, the Rich Storage UNC provider 340 can change a file name associated with a request that initially originates from a UNC stack, to a morphed local name—(encoded therein exists the volume that hosts the filestream files for such store and original UNC name.) A reparse message can be sent back to the I/O manager 230. Based on the sharename, the volume to reparse can then be designated.

In general, all filters above the Rich Storage File System filter 350 view the morphed name, and the create request reaches the local filter stack 320, as indicated by 308. Typically, there exists no filter between the Rich Storage File System filter 350 and the file system 353. Moreover, the Rich Storage File System filter 350 can queue a request 310, which is picked by the NSO 360—and the NSO 360 can then return an associated GUID name to the Rich Storage File System filter 350, as indicated by 311; for example. Moreover, the Structured Query Language's (SQL's) filestream component (not shown) can create a GUID file in the file system.

The morphed name can be modified in the FileObject to the actual GUID file name, and can forward a create request to the file system 353 for processing, as indicated by 312. The response from the file system 353 can be forwarded to the Rich Storage File System filter 350, as indicated by 313. After processing on the Rich Storage File System filter 350, and the NSO component 360, the call can return to the I/O manager, and back to the application.

Figure 4:
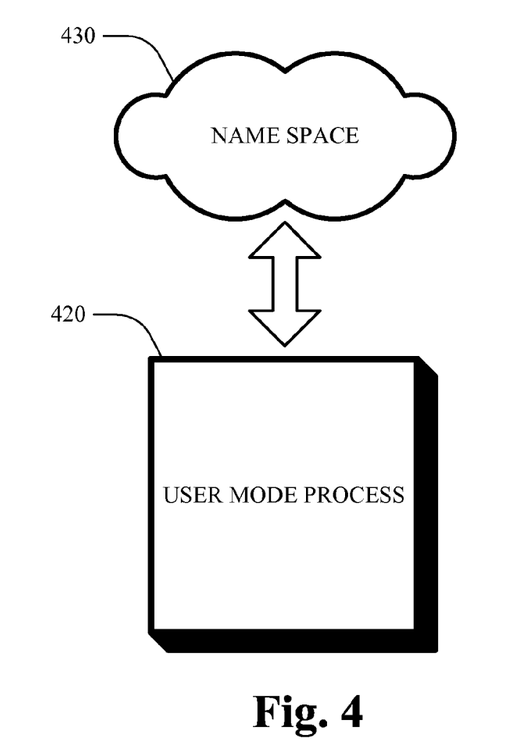
FIG. 4 illustrates a user mode process that can own and manage a name space.
Figure 5:
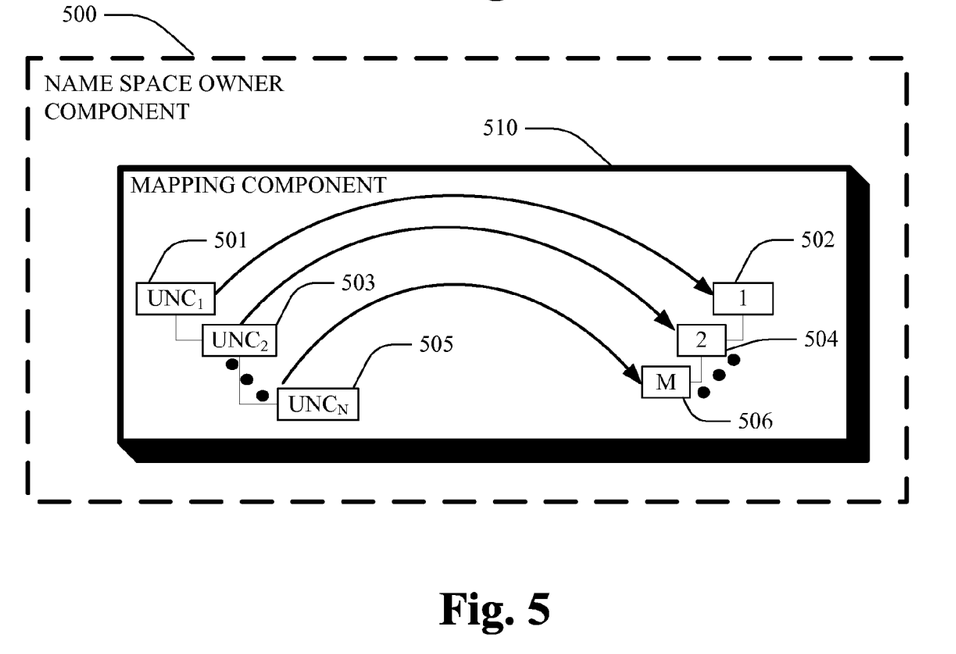
FIG. 5 illustrates a name space owner component (NSO) that can contain a list of file names saved on the file system according to an aspect of the subject innovation.

FIG. 4 illustrates a user mode process 420 (as opposed to a file system) that can own and manage name space(s) 430. For example, user mode processes 420 are enabled to register with a file system—such as a Rich Storage File System—and manage name spaces 430. In a related aspect, FIG. 5 illustrates a name space owner component (NSO) 500 that can contain a list of the file names saved on the file system, and include a mapping component 510 that enables mapping between UNC file names and file locations. Such mapping component 510 can represent a mapping between UNC file names 501, 503, 505, (1 thru N, N being an integer) and file locations 502, 504, 506 (1 thru M, M being an integer), in accordance with an aspect of the subject innovation. Various dependencies can be established for tracing between UNC file names 501, 503, 505 and the file locations 502, 504, 506, to generate a match list therebetween. Moreover, a filter block arrangement can be established, so that only the NSO can observe and manage the local name—and deny such access to other components/parties.

Figure 6:
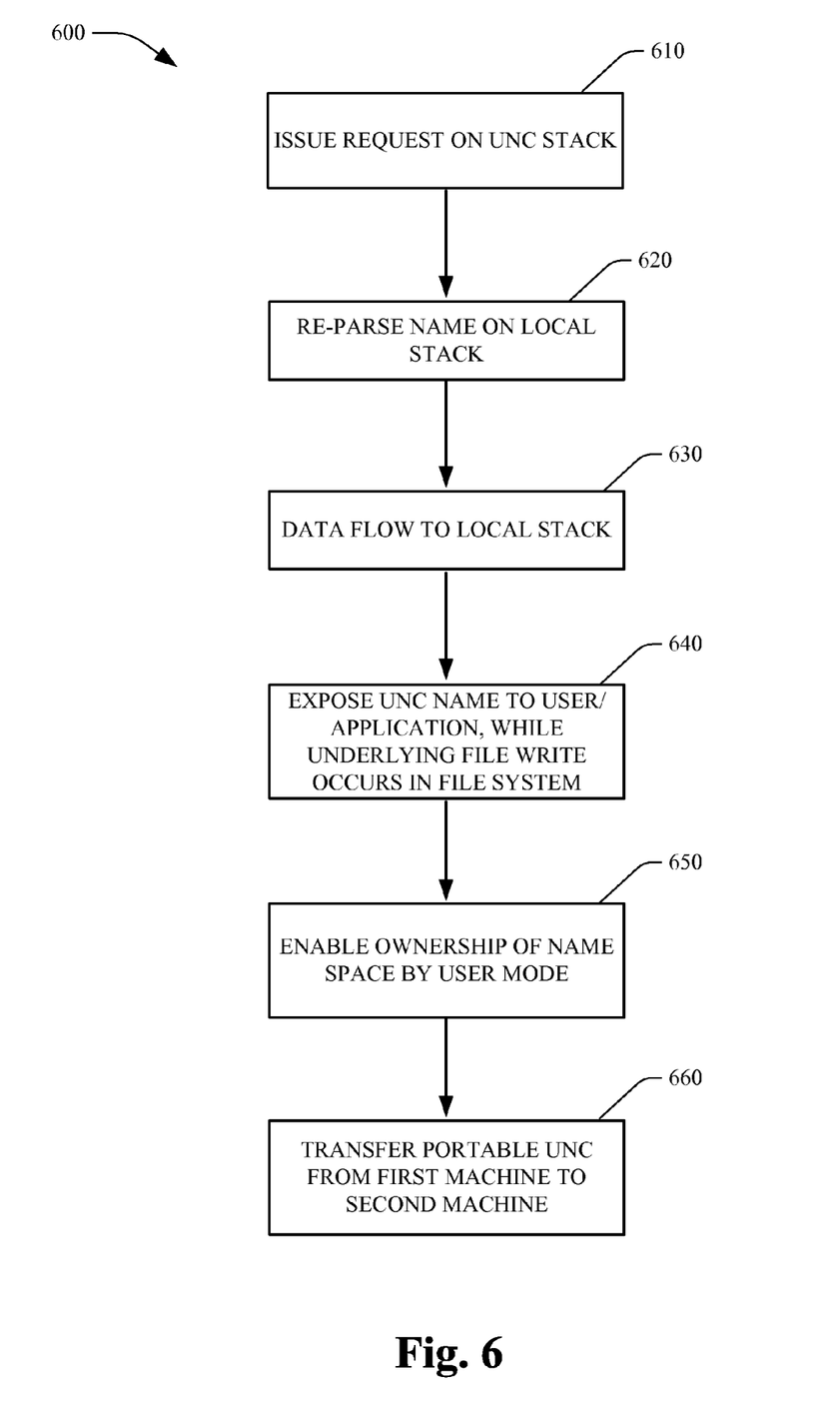
FIG. 6 illustrates a methodology of creating a virtual name space of Universal Naming Convention over a local file system, in accordance with an aspect of the subject innovation.

FIG. 6 illustrates a methodology 600 of creating a virtual name space of Universal Naming Convention over a local file system, in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 610 a call can be initiated by an application/user in a UNC stack. Such can for example include a "create file" request being issued and a handle to the file created. Related data structure can consist of an associated name file, wherein a name in the file object can then be changed to a local name (e.g., morphed name), and reparsed to a volume where the local file exists, at 620. Additionally, by identifying the volume (e.g., storage location) of the file that the user is opening, the status reparse can then be forwarded to that volume. The status reparse can designate to the I/O manager that the name in the file has been changed, and as such re-processing is required even though a failure has not occurred. Next and at 630, items and file objects associated with the call can flow to a local stack. For example, the create file request can be transferred to an Input/Output (I/O) manager that handles such request. Accordingly, and at 640, the name space can be exposed in UNC format, yet the underlying file write can occur in the file system. This can further enable a user mode process (as opposed to a file system) to own name spaces and manage it, at 650. For example, user mode processes can register with a file system—such as a Rich Storage File System—and manage name spaces. The UNC name space can then be carried over from a first machine to a second machine as indicated at 660.

Figure 7:
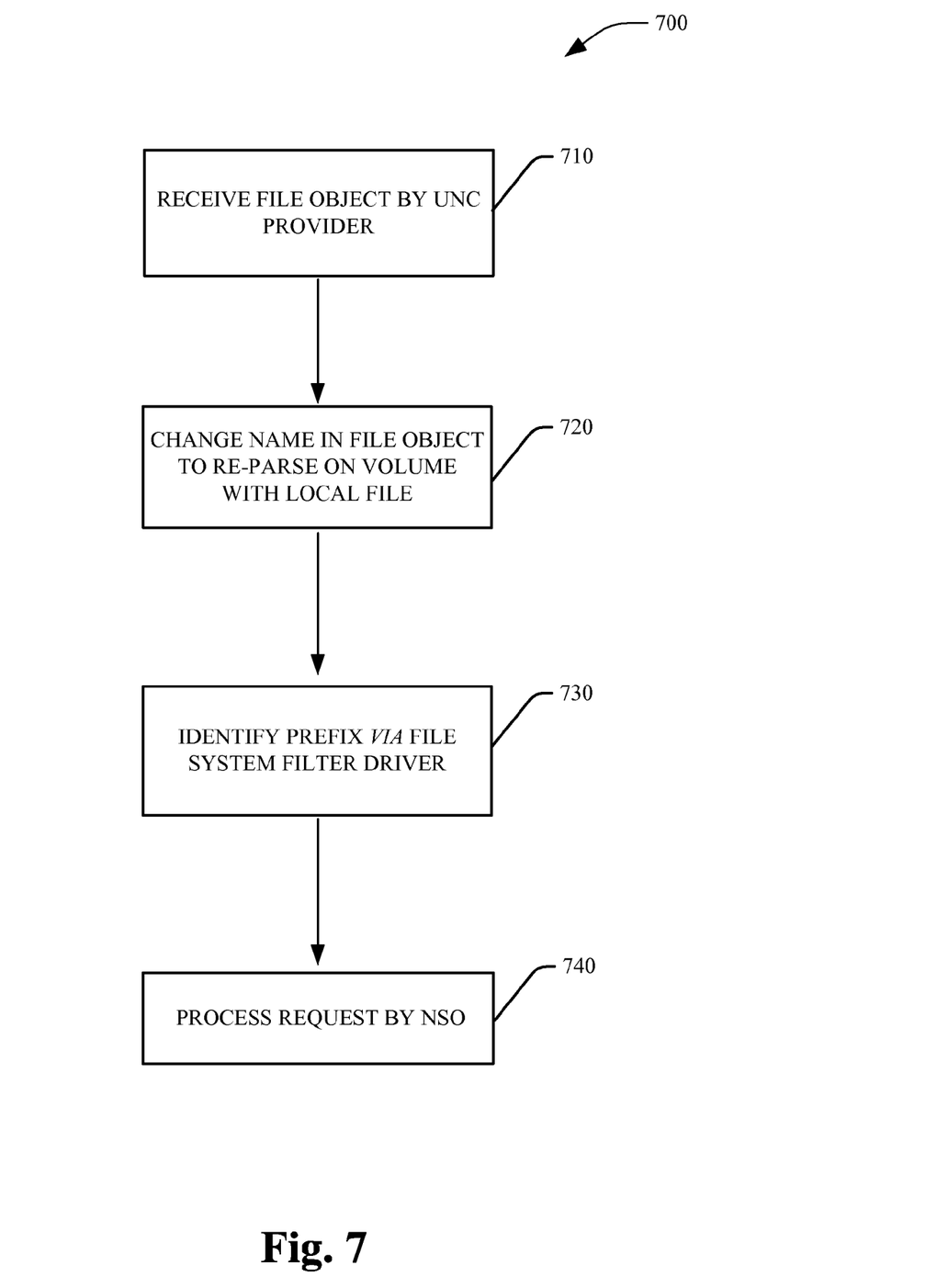
FIG. 7 illustrates a related methodology of exposing a name space in UNC format to an application/user according to a particular aspect of the subject innovation.

FIG. 7 illustrates a related methodology 700 of exposing a name space in UNC format to an application/user, in accordance with an aspect of the subject innovation. Initially and at 710, a MUP component can determine which file system should handle various files, and the files can be received by a UNC provider (such as a Rich Storage File UNC provider.) Subsequently and at 720, the Rich Storage UNC provider can change the FileName of the FileObject to a morphed local name (with the volume which hosts the filestream files for this store and original UNC name encoded), and return a reparse message back to I/O manager. Such reparse occurs on a local stack (with the request originating from a UNC stack) and with a volume where the local file exists. The volume to be reparsed can be identified based on a sharename. Moreover, a filter driver that is located on the File System can identify a prefix that is associated with such name, to trap the request forwarded to the local stack, at 730. The request can then be forwarded to the NSO for additional processing as indicated at 740.

Figure 8:
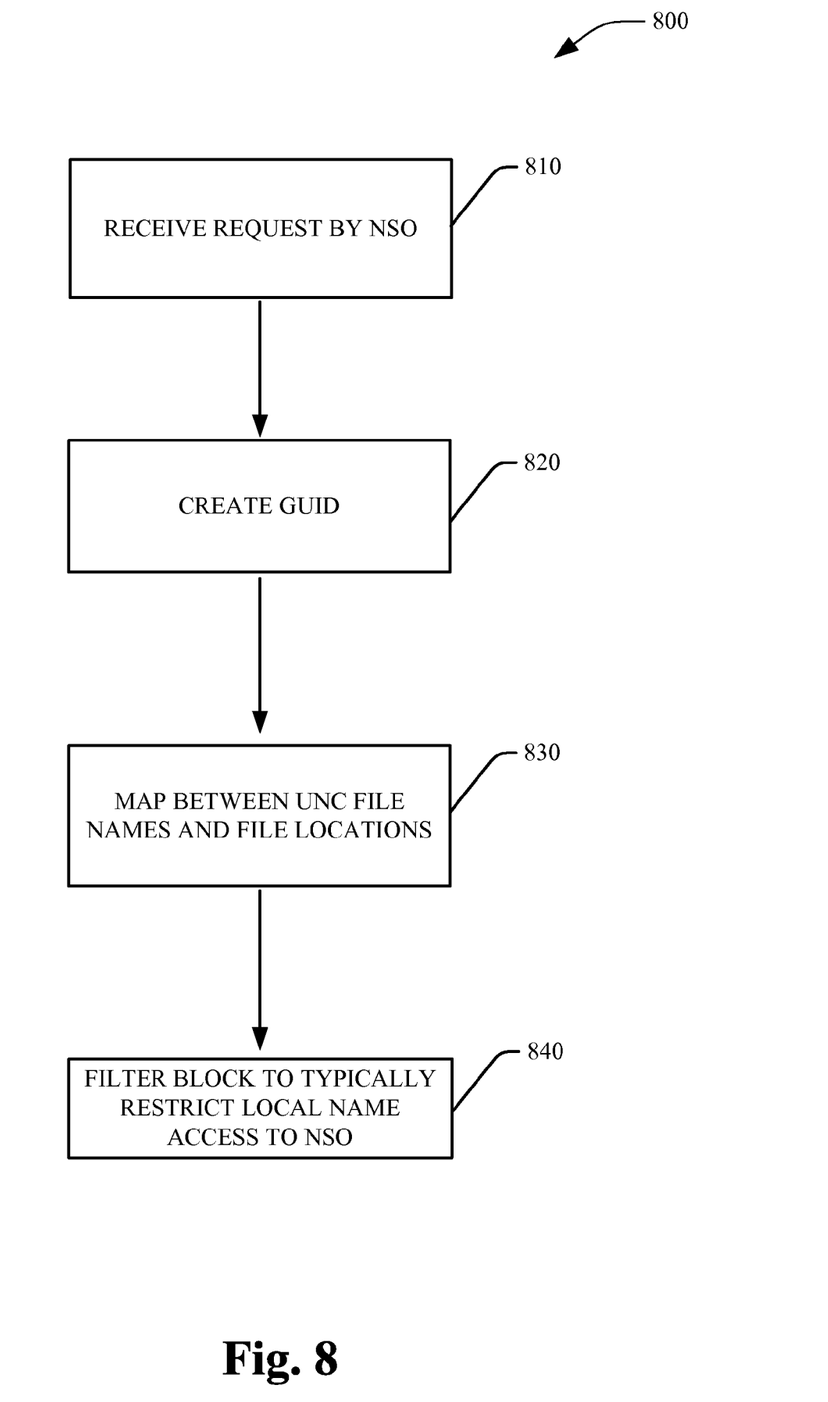
FIG. 8 illustrates a methodology of processing a request by the NSO according to a particular aspect of the subject innovation.

FIG. 8 illustrates a methodology 800 of processing a request by the NSO according to a particular aspect of the subject innovation. The methodology 800 initiates at 810, wherein a request associated with an application interacting with UNC namespace, is received by the NSO. At 820, a GUID can be created via a Structured Query Language's (SQL's) filestream of the NSO. Moreover and at 830, the NSO can supply a mapping between UNC file names and file locations. For example, various dependencies can be established for tracing between UNC file names and the file locations to generate a match list therebetween. At 840, a filter block arrangement can be established, so that only the NSO can observe and manage the local name, and to deny such access for other components/parties.

Figure 9:
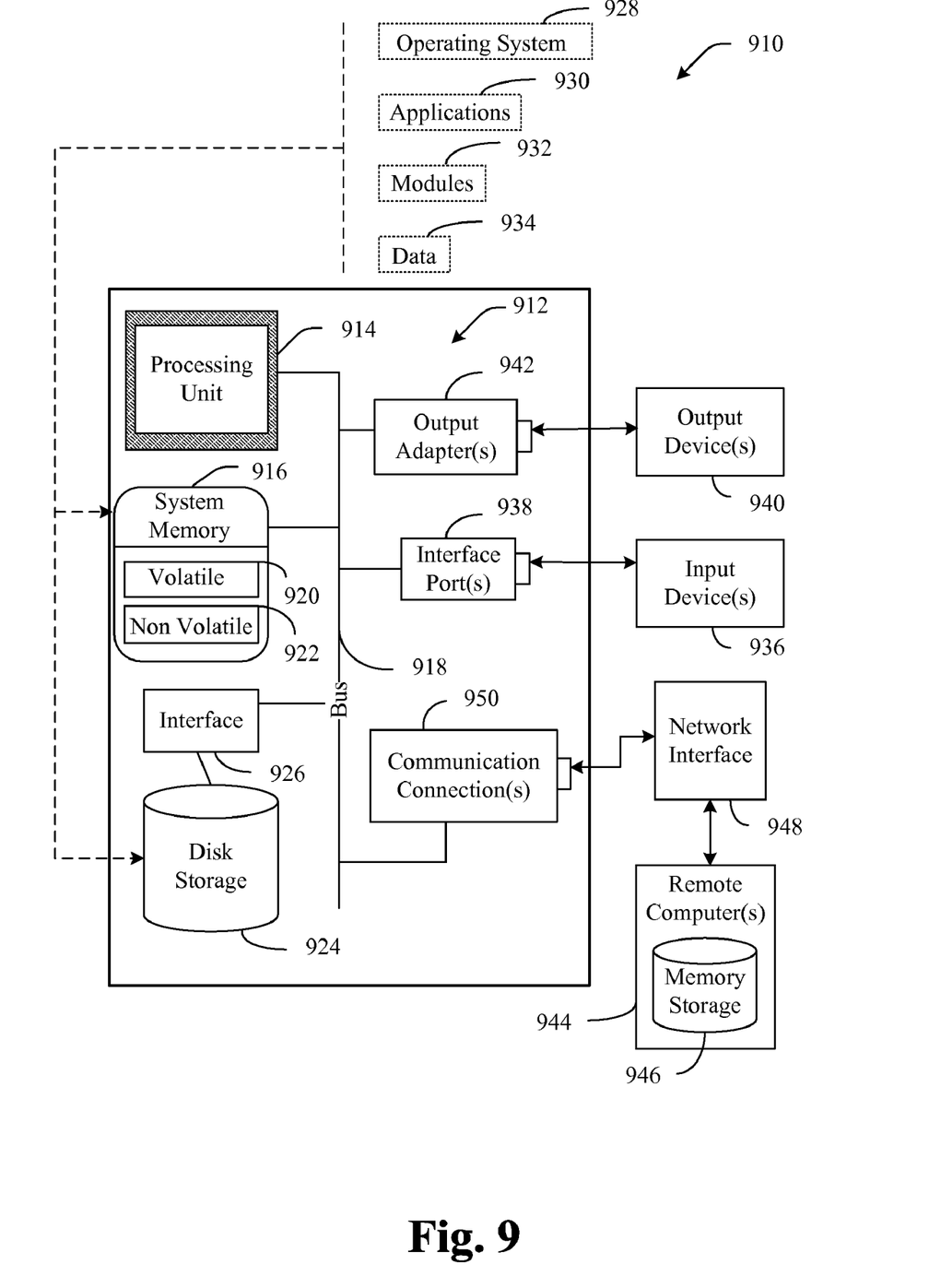
FIG. 9 illustrates an exemplary environment for implementing various aspects of the subject innovation.
Figure 10:
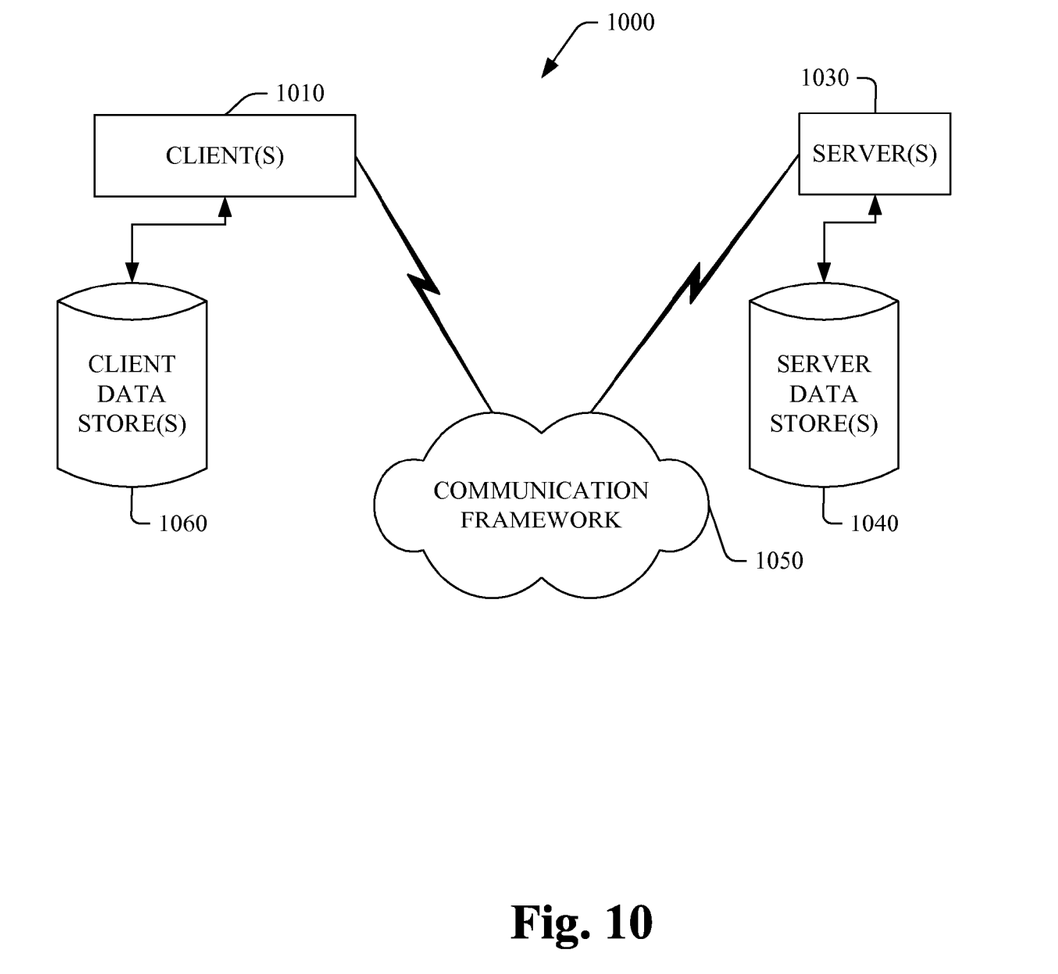
FIG. 10 is a schematic block diagram of an additional computing environment that can be employed to implement the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), PCI-Express Bus, Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed to supply a UNC name space to applications in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising:
   at least one processor; and
   a memory that retains code instructions that when executed by the at least one processor effect at least the following:
      a user-mode Universal Naming Convention (UNC) name space accessible to an application that issues a file input/output (I/O) call from a remote UNC stack, wherein the user-mode UNC name space is transferable amongst a plurality of computers, such that the UNC name space is exposed in UNC format while any underlying file writes occur in a local file system volume;
      a UNC provider that is configured to perform the following:
         create a virtual UNC name space over a local file system;
         change a name in a file object of the file I/O call to reparse the file object with the changed name on to the local file system volume where the local file associated with the UNC name space resides, wherein the reparse occurs on a local file system stack such that the user-mode UNC name space is exposed in UNC format while any underlying file writes occur in the local file system, enabling both the UNC provider and a local namespace provider to use the same data store; and
         uniquely mark any opened file objects that have a changed name changed via the UNC provider such that the UNC-changed-name opened files are differentiated from files that are opened using a local name to allow a local file-side filter to recognize UNC-changed-name files by their unique mark and respond to file open requests for UNC-changed-name files in a manner different than that for local files, allowing the application to interpret file I/O calls for both local and UNC namespaces that access the same data;
      a user-mode Name Space Owner component (NSO) for maintenance of a mapping between the UNC name space and local names; and
      a local file system filter block that restricts access to the local names to one or more components except the user-mode NSO.

2. The computer implemented system of claim 1 further comprising a UNC filter stack located between the UNC provider and an I/O manager, the I/O manager receives the file I/O call in a kernel mode.

3. The computer implemented system of claim 1, further comprising a UNC filter stack and MUP that are located between the UNC provider and an I/O manager.

4. The computer implemented system of claim 1 further comprising a Multiple UNC provider for determination of a file system that handles the file I/O call.

5. The computer implemented system of claim 1, wherein the user-mode NSO owns the user-mode UNC name space.

6. The computer implemented system of claim 1 further comprising a file system filter driver that identifies a prefix in a file name of the file object on the local files.

7. The computer implemented system of claim 1 further comprising a GUID returned by the NSO to the file system.

8. A computer implemented method comprising the following computer executable acts:
   employing one or more processor to execute code instructions stored in a computer-readable medium, the code instructions when executed by the one or more processor perform at least the following acts:
      originating a call on a Universal Naming Convention (UNC) stack by an application that interacts with a UNC name space, wherein the UNC name space is exposed in UNC format while any underlying file writes occur in a local file system volume;
      creating a virtual UNC name space over a local file system;
      reparsing a file object associated with the call to the local file system volume where a local file associated with the UNC name space resides, wherein the reparse occurs on a local file system stack such that the user-mode UNC name space is exposed in UNC format while any underlying file writes occur in the local file system, enabling both the UNC provider and a local namespace provider to use the same data store;
      uniquely marking any opened file objects that have a changed name changed via the UNC provider such that the UNC-changed-name opened files are differentiated from files that are opened using a local name to allow a local file-side filter to recognize UNC-changed-name files by their unique mark and respond to file open requests for UNC-changed-name files in a manner different than that for local files, allowing the application to interpret file I/O calls for both local and UNC namespaces that access the same data;
      exposing the UNC name space to the application in UNC format while processing a file associated with the call in a kernel-mode local file system;
      owning and managing the UNC name space by a user mode process that interacts with the application; and filter blocking file locations to limit access to a Name Space Owner that manages local names in the kernel-mode file system.

9. The computer implemented method of claim 8 further comprising writing an underlying file associated with the call in a file system of the local file system volume.

10. The computer implemented method of claim 8, the reparsing act further comprising changing a name in the file object for a reparse thereof to a volume where a local file resides.

11. The computer implemented method of claim 10 further comprising identifying a prefix that is associated with a changed name, via a filter driver.

12. The computer implemented method of claim 11 further comprising mapping between UNC file names and the file locations.

13. The computer implemented method of claim 10, the originating act further comprising creating a new file request and transferring the new file request to an Input/Output (I/O) manager for a handling thereof.

14. The computer implemented method of claim 13 further comprising identifying a storage location of a file associated with the call.

15. The computer implemented method of claim 14 further comprising forwarding reparsed object files to the storage location.

16. A computer implemented system comprising:
   at least a processor to execute code instructions stored in a computer-readable medium, the code instructions when executed by at least the processor effect at least the following:
   means for initiating a call on a user-mode Universal Naming Convention (UNC) stack from a remote UNC stack, wherein the user-mode UNC name space is transferable amongst a plurality of computers, such that the UNC name space is exposed in UNC format while any underlying file writes occur in a local file system volume;
   means for creating a virtual UNC name space over a local file system;
   means positioned on a local stack for changing a name in a file object of the call to reparse the file object with the changed name on to the local file system volume where the local file associated with the UNC name space resides, wherein the reparse occurs on a local file system stack such that the user-mode UNC name space is exposed in UNC format while any underlying file writes occur in the local file system, enabling both the UNC provider and a local namespace provider to use the same data store;
   means for uniquely marking any opened file objects that have a changed name changed via the UNC provider such that the UNC-changed-name opened files are differentiated from files that are opened using a local name to allow a local file-side filter to recognize UNC-changed-name files by their unique mark and respond to file open requests for UNC-changed-name files in a manner different than that for local files, allowing the application to interpret file I/O calls for both local and UNC namespaces that access the same data; and
   means for filtering access to file locations to one or more components except a component that manages local names in a kernel-mode file system related to the file object of the call.

17. The computer implemented method of claim 8, further comprising transferring the UNC name space from a first machine to a second machine.

* * * * *